United States Patent

[11] 3,614,569

[72] Inventor Owen E. Reinert
 St. Louis, Mo.
[21] Appl. No. 872,535
[22] Filed Oct. 30, 1969
[45] Patented Oct. 19, 1971
[73] Assignee Emerson Electric Co.
 St. Louis, Mo.

[54] DC MOTOR CONTROLLERS WITH IR COMPENSATION FOR EXTENDED SPEED RANGE
 10 Claims, 4 Drawing Figs.
[52] U.S. Cl. .................................................. 318/345,
 318/332
[51] Int. Cl. ....................................................... H02p 5/16
[50] Field of Search............................................ 318/331,
 332, 341, 345

[56] References Cited
 UNITED STATES PATENTS
3,064,174 11/1962 Dinger............................ 318/331
3,239,742 3/1966 Mierendorf................... 318/331
3,447,055 5/1969 Mason........................... 318/331
3,037,157 5/1962 Young........................... 318/331

Primary Examiner—T. E. Lynch
Assistant Examiner—Thomas Langer
Attorney—Polster and Polster ABSTRACT: In a standard speed control circuit for DC electric motors, such circuit generally being comprised of an external speed command potentiometer electrically connected to an amplifier, a negative feedback loop indicating motor armature voltage electrically connected to said amplifier, and a positive IR compensation loop electrically connected to said amplifier, which amplifier feeds a signal to a triggering circuit which in turn is electrically coupled to a silicon controlled rectifier circuit, such rectifier circuit being the final resolver of motor speed, means are provided to reduce progressively the effect of the IR compensation input to the amplifier as speed command is increased.

INVENTOR
OWEN E. REINERT

Inventor
OWEN E. REINERT

DC MOTOR CONTROLLERS WITH IR COMPENSATION FOR EXTENDED SPEED RANGE

BACKGROUND OF THE INVENTION

This invention relates to a modification of a speed control circuit for DC motors for which the current source is rectified AC. In the most common forms of speed control, the armature voltage is used as a feedback representative of speed. However, as the armature voltage is a sum of the counter electromotive force of the motor and the voltage drop due to armature resistance, the use of armature voltage feedback alone to represent speed is not entirely accurate. The relationship becomes especially suspect as speed is decreased. To overcome this difficulty, it is common to provide IR compensation circuits in conjunction with some form of speed control circuit. In general, an IR compensation voltage may be provided by the addition of a resistor shunt in series with the motor armature. The voltage developed across the shunt is amplified to make it proportional to the voltage drop due to armature resistance and is then electronically subtracted from the armature voltage feedback. The resultant is compared with an external speed command and the motor speed is electronically adjusted accordingly.

Circuits previously devised to provide such IR compensation correction have functioned reasonably well where the motor speed range desired to be regulated with relatively narrow: that is, if the lowest speed for which regulation was desired were determined to be X revolutions per minute, the highest speed at which regulation was effective would be in the vicinity of 3X revolutions per minute. This span of regulated speed is generally determined by the proposed motor application. The necessity of broader speed ranges in certain DC machine applications pointed out the limitations of such prior circuitry. Where extremely broad speed range and accurate regulation were required, that is, in the area of 50X revolutions per minute, the attempts to provide continuous IR compensation and close speed regulation failed due to the unstability of the speed control circuit. The use of a given amount of IR compensation, sufficient to maintain a constant speed-torque characteristic at a low speed, causes the speed control circuit to hunt at high speed if the same amount of compensation is used over the total speed range.

A reduction in the influence of the IR compensation circuit with increased speed was found to eliminate the hunting condition and allowed an increased range of speed control with relatively close tolerances at both ends of the speed range.

One of the objects of this invention is to provide IR compensation over a wide range of speed control, maintaining the ability of high-accuracy speed regulation at both the high and low end of the speed range band without occurrence of the hunting mentioned above.

Other objects will become apparent to those skilled in the art in light of the following description and accompanying drawings.

SUMMARY OF THE INVENTION

In accordance with this invention generally stated, a motor control is provided in which the armature voltage of the motor, diminished by a voltage corresponding to the IR drop of the armature, is used as feedback. The IR signal magnitude however, is reduced as speed increases to eliminate undesirable compensation loop effects at higher motor speeds, thereby giving a wide range of regulated speed control.

In the preferred embodiment, the IR signal reduction is accomplished by the action of a transistor switch, which saturates during the cyclic interval when a flyback or inductance discharge diode in the armature circuit is not conducting. Conduction by the transistor switch reduces the IR compensation amplification ability of a second transistor by biasing the second transistor's base electrode. That part of a cycle during which the flyback diode is not conducting increases as speed increases, thereby continually causing the switch to reduce the IR compensation signal.

DESCRIPTION OF THE PREFERRED EMBODIMENT

Figure 1:
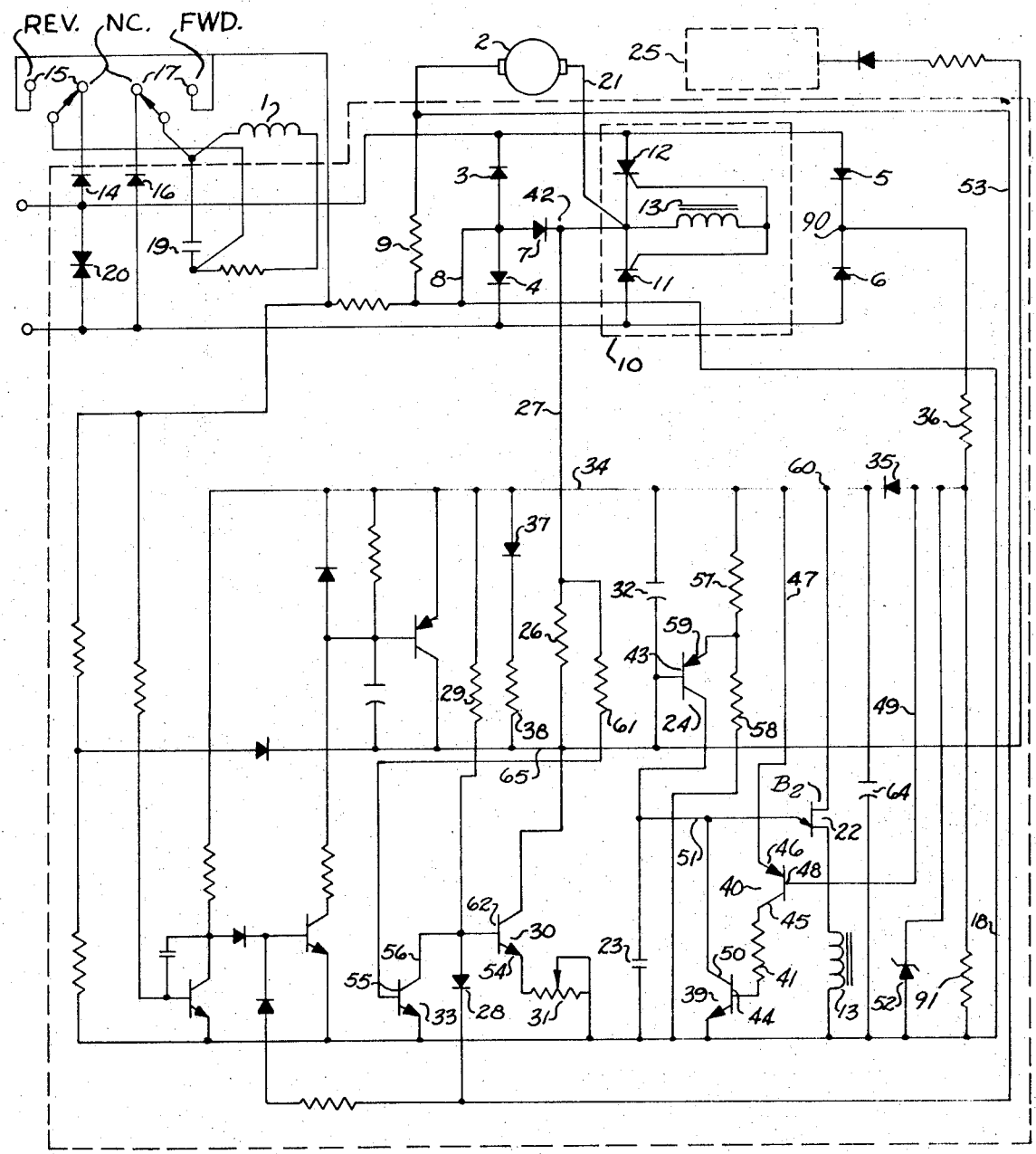
FIG. 1 is a schematic view of an entire motor control circuit, including that portion which comprises the invention herein and in addition, showing the invention contained in my copending, now allowed, application Ser. No. 872,536, filed Oct. 30, 1969, dealing with an improved means of field reversal for a DC machine.
Figure 2:
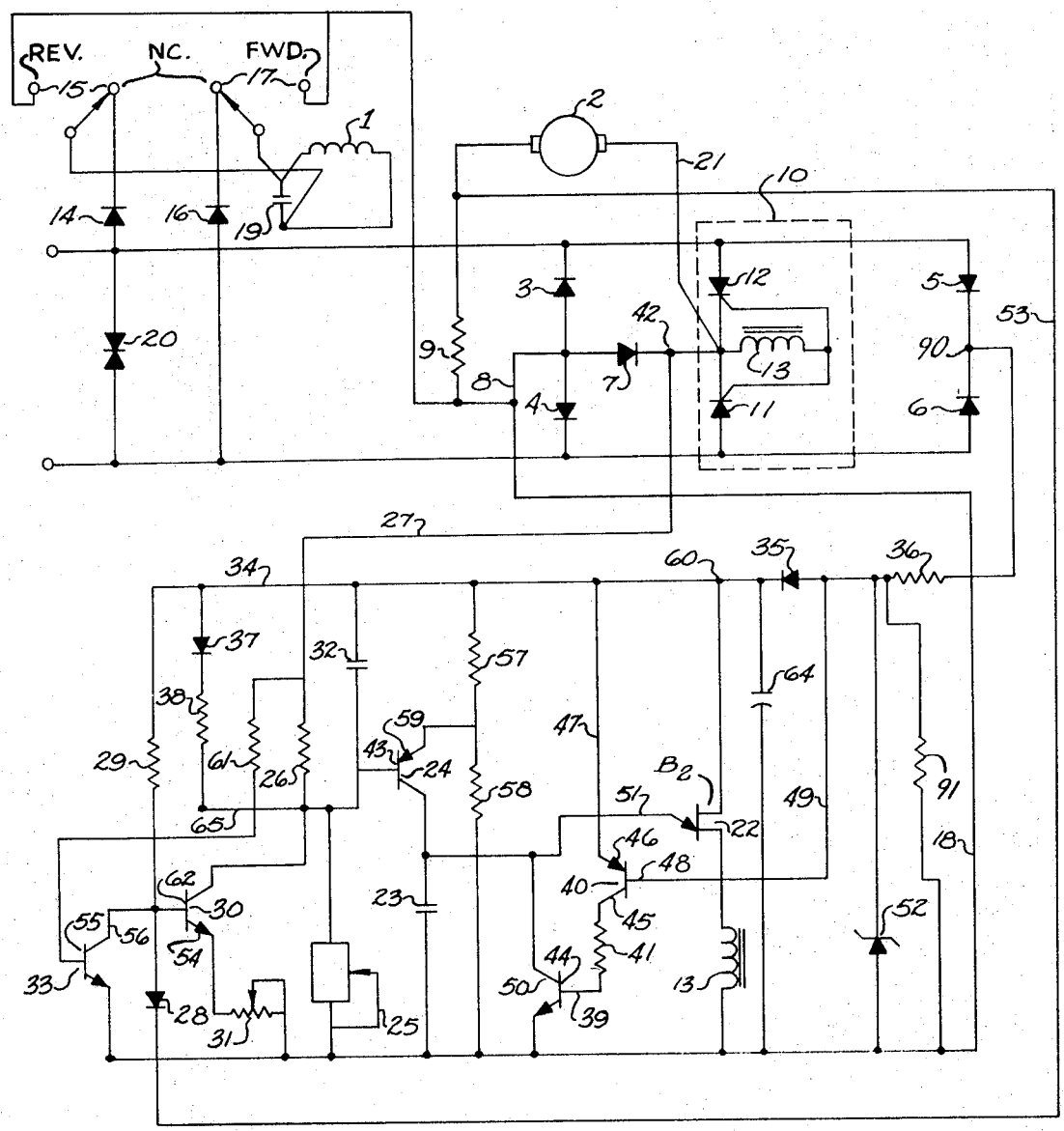
FIG. 2 is a diagrammatic view of the preferred circuit of this invention, in simplified form, corresponding to FIG. 1, illustrating only those circuit elements needed to describe the invention herein.

Referring now to FIG. 2, the simplified version of the circuit representing this invention, reference numeral 1 indicates a separately excited field of a DC machine and numeral 2, its wound armature. An AC power source not shown in FIG. 2 is connected to a full wave bridge rectifier consisting of diodes 3, 4, 5 and 6. One side of the output of this rectifier is electrically connected via a line 8 to a shunt resistor 9 which is in series with the armature 2. The armature 2 is then electrically connected via a line 21 to a silicon-controlled rectifier circuit 10, consisting of silicon-controlled rectifiers 11, and 12. A flyback diode 7 is electrically connected in parallel across the series circuit comprising the resistor 9 and the armature 2. The field 1 is connected to the supply line through either a diode 14 and a switch 15 or a diode 16 and a switch 17, depending upon the direction of rotation desired. There is a capacitor 19 electrically connected in parallel with the field 1. A surge suppressor circuit 20 is electrically connected across the line for protection against line voltage transients. The control gates of the silicon-controlled rectifiers 11 and 12 are electrically connected to the secondary of a transformer 13. The primary of transformer 13 is electrically connected to a triggering circuit comprising a unijunction transistor 22, a capacitor 23 and a transistor amplifier 24. An external speed command signal may be generated from a speed command potentiometer represented by reference numeral 25 and is applied to the amplifier 24. A negative feedback signal is developed from a connection node 42 via a line 27 over a resistor 26 and applied to the amplifier 24. An IR compensation input signal is applied to the amplifier 24 through the utilization of an IR compensation loop which includes resistor 9, a line 53, a forward drop compensating diode 28, a resistor 29, a transistor 30, a potentiometer 31 and a capacitor 32. Control of the IR compensation circuit is accomplished by the use of the diode 7, the cathode of which is electrically connected at node 42, via line 27, a resistor 61 and a transistor switch 33. Resistor 29 is electrically connected to the second side of the output rectifiers represented by diodes 5 and 6 via a conductor 34, a node 60, a diode 35, and a resistor 36. A diode 37 and a resistor 38 are electrically connected to a base 43 of amplifier 24 via a line 65. Emitter 59 of amplifier 24 is electrically connected through a resistor 57 to node 60 and through a resistor 58 to the anodes of rectifiers 3 and 4, via a line 18. Because of the voltage distribution present in the control circuit, the bias apportionment provided by the components, i.e. diode 37, resistor 38, resistor 57 and resistor 58, is necessary in order to achieve zero armature speed should such speed be commanded by the external speed command 25. A base 44 of a transistor 39 is electrically connected through a resistor 41 to a collector 45 of a transistor 40. Emitter 46 of transistor 40 is electrically connected via a conductor 47 to the cathode side of diode 35. A base 48 of transistor 40 is electrically connected to the anode side of diode 35 via a conductor 49. A collector 50 of transistor 39 is electrically connected via a line 51 to capacitor 23. Transistor 40, resistor 41 and transistor 39 act in conjunction with capacitor 23 to synchronize the unijunction transistor 22 to the supply voltage, and in particular, transistors 39 and 40 and provide a means of discharging capacitor 23 without a triggering impulse also being given to the unijunction transistor 22. A capacitor 64 and a zener diode 52 are electrically connected in parallel and provide filtered and regulated voltage to power the amplifier 24. The voltage across capacitor 64 may be considered a constant DC voltage. Any time the rectifier voltage at anode 90, between diodes 5 and 6, becomes small enough to produce a voltage across resistor 91 less than the voltage across capacitor 64, then diode 35 becomes back biased. When diode 35 is back biased, a current flow path is established from the positive terminal at capacitor 64, via lines 34 and 47, through emitter 46 and base 48 of transistor 40 to the anode side of diode 35 via conductor 49, and through a resistor 91 and to the negative terminal of capacitor 64. The emitter-base current flow of transistor 40 causes that transistor to reach saturation and conduct, which conduction produces a current flow and corresponding voltage in resistor 41. Voltage across resistor 41 biases transistor 39 into conduction. Conduction by transistor 39 discharges capacitor 23 without pulsing unijunction transistor 22. The arrangement thus described is known in the art as a means for giving precise unijunction control and represents merely one example of synchronization compatible with the broader concept of my invention.

In operation, an IR compensation signal proportional to motor armature current is developed over resistor 9. This signal is fed via a line 53 through the forward drop compensating diode 28 to the base 62 of the transistor 30. Diode 28 is rendered conducting due to the biasing voltage developed across the resistor 29 caused by the presence of a current delivered via line 34 originated over the diode 35 and resistor 36, which are electrically connected to one side of the full wave bridge rectifier. The gain of this IR signal is adjusted by the potentiometer 31 electrically connected to emitter 54 of transistor 30 and the signal is stored in capacitor 32. The technique for obtaining an IR compensation signal thus described is conventional. A negative feedback signal is developed from the armature 2 via line 27 across the resistor 26. In the normal speed ranges, this negative signal is compared with the positive IR compensation signal stored in capacitor 32 which signal has been added to the signal developed in the external speed command 25. The electrical summation of these three signals is accomplished at the base 43 of the transistor amplifier 24. The resultant signal is amplified by the transistor 24 and this amplified signal determines the charging rate for capacitor 23. The charging rate of capacitor 23 coacts with unijunction transistor 22 to provide a cyclic time-oriented pulse which is coupled via transformer 13 to the silicon-controlled rectifier circuit 10, the pulse being used to control the conduction angle of the SCR circuit. The system thus described includes a negative feedback of speed dependent armature voltage via line 27 and resistor 26, and a positive feedback of current (IR compensation) via resistor 9, line 53 and transistor 30. Negative and positive feedback are used in their conventional sense in that a negative feedback loop around a variable reduces the effect of a change in that variable upon the output while a positive feedback loop around a variable increases the effect of a change in that variable upon the output over that which would have occurred without the feedback.

Figure 4:
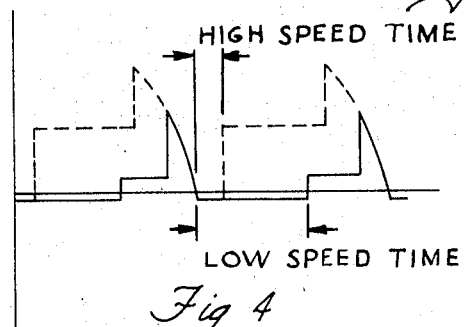
FIG. 4 is a graph illustrating the input voltage to the armature circuit against time which demonstrates the portion of the cyclic interval during which the flyback diode in the armature circuit conducts.

The flyback diode 7 conducts during what may be termed the negative portion of the rectified input cycle. In actuality, because of the utilization of full wave rectification in the preferred embodiment, this portion of the cycle may be further referred to as that time where motor current exists but that current is prevented from flowing into the SCR circuit 10 by the presence of diodes 3 and 4. Such cyclic interval is readily seen by reference to FIG. 4 of the drawings. This portion of the cycle decreases as speed increases, that is, diode 7 is conducting for a reduced portion of one cycle as speed increases.

While diode 7 is not conducting, the presence of armature voltage at node 42 causes a current to flow through resistor 61. The resulting voltage biases a base 55 of the transistor 33 causing that transistor to reach saturation, or in effect, to turn on electronically. While transistor 33 is conducting, its collector 56 is drawing electrons from a base 62 of transistor 30, thereby causing a reduction in the ability of transistor 30 to amplify the IR compensation signal. Thus, reduction in amplification is dependent upon motor speed which in turn causes the gain of the positive feedback current loop (IR compensation) to be speed dependent.

Figure 3:
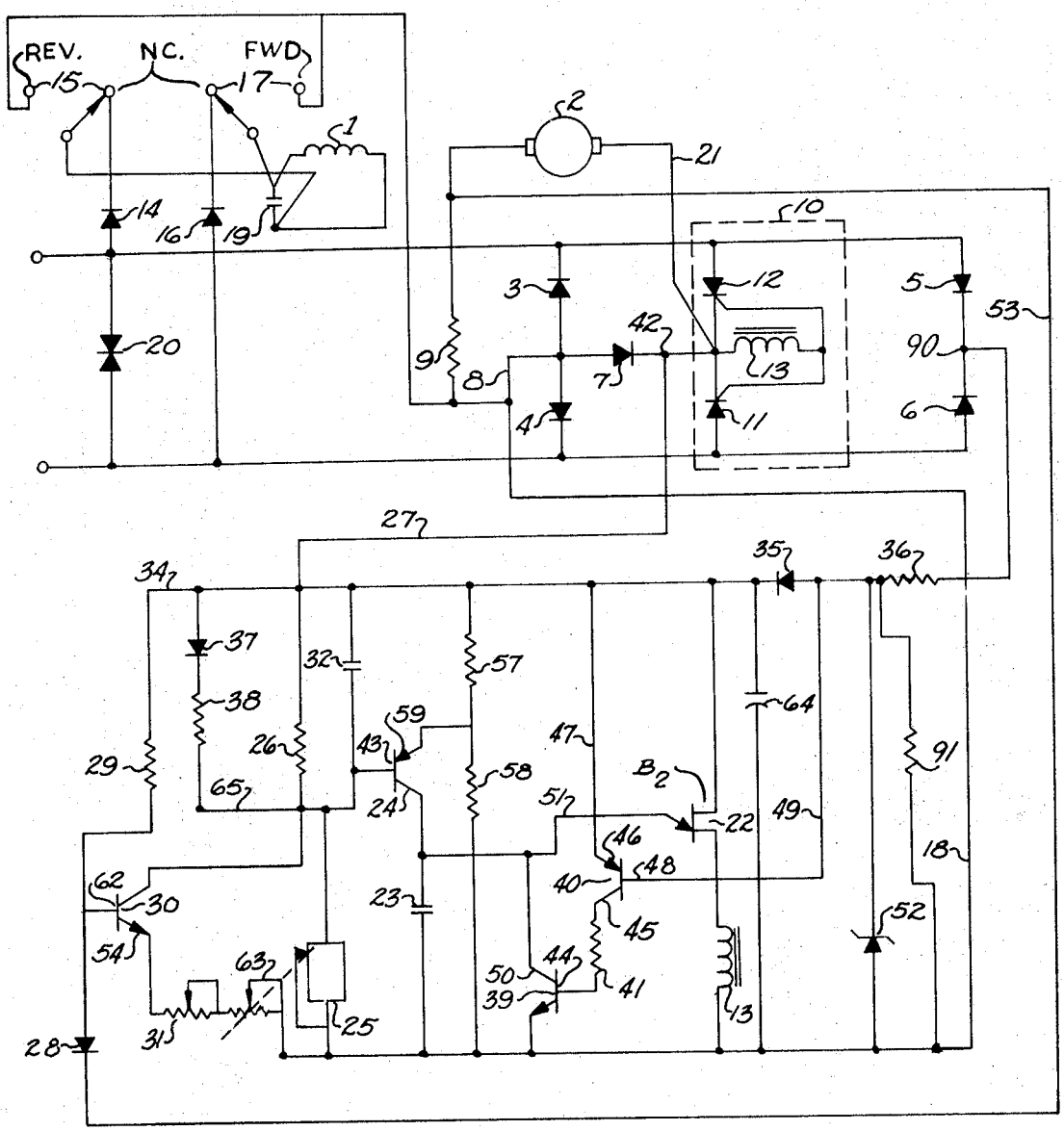
FIG. 3 is a diagrammatic view of an alternative form of the circuit of this invention, utilizing ganged signal potentiometers rather than the transistorized circuit of FIG. 2.

Referring now to FIG. 3, an alternative means of accomplishing the gain reduction of the IR compensation signal using potentiometers to achieve such reduction is shown. A potentiometer 63 is mechanically connected, as by a common shaft, to the external speed control potentiometer 25 is set at maximum resistance, that is, minimum speed command, potentiometer 63 is at zero resistance. Manually decreasing the speed control potentiometer 25 toward zero ohms increases the resistance of potentiometer 63. While diode 7 can be eliminated if desired in this embodiment, its presence as a discharge path for the armature is valuable even though it would no longer play a part in the regulation of the IR compensation signal. The remainder of the circuit functions in a manner similar to that described above with the exception that the gain of transistor 30 is now modified by the additional potentiometer 63 rather than by the method disclosed in the preferred embodiment. A workable system for a one-half horsepower DC motor indicates that where potentiometer 31 has a value of approximately 1,000 ohms, potentiometer 63 should be variable to a range of approximately 10,000 ohms. THese values are merely illustrative.

Numerous variations in the control circuit of this invention within the scope of the appended claims will occur to those skilled in the art in the light of the foregoing disclosure. Equivalent components can be substituted. Thus for example, discrete resistors with a selector switch to put them selectively into the circuit may be substituted for the conventional potentiometer shown in the drawing and all such devices are encompassed within the term potentiometer as used in the appended claims. Different circuitry in the conventional portion of the control can be used. For example, referring to FIG. 2, the unijunction transistor 22 may be sychronized to the supply voltage without the use of transistors 39 and 40 and resistor 41 by disconnecting base 2, indicated by B₂ in the drawings, of unijunction transistor 22 from the line 34 at node 60 on the cathode side of diode 35 and reconnecting said base 2 at some point on the anode side of diode 35. These variations are merely illustrative.

The circuit described may be effectively utilized with any type of DC machine in which speed is regulated by control of armature voltage while the field is maintained at a substantially constant value, the separately excited or permanent magnet DC machine being illustrative.

Having thus described the invention, what is claimed and desired to be secured by Letters Patent is:

1. In a speed control circuit for DC electric motors, including an amplifier, a reference speed command electrically connected to said amplifier, means for establishing a signal representing armature speed electrically connected to said amplifier, and means for establishing an IR compensation correction signal input electrically connected to said amplifier, the improvement comprising means for automatically varying the gain applied to said IR compensation correction signal input to said amplifier with speed of said DC electric motor, said means including a rectifier connected in parallel with the armature of said DC motor.

2. The improvement of claim 1 further characterized by a switch, responsive to conduction of said rectifier, electrically connected to said rectifier and to said IR compensation establishing means and operatively adapted to reduce IR compensation signal input gain to said amplifier as motor speed increases.

3. The improvement of claim 2 wherein said switch is a transistor.

4. In a speed control circuit for DC electric motors, including an amplifier, a reference speed command electrically connected to said amplifier, means for establishing a signal representing armature speed electrically connected to said amplifier, means for controlling armature voltage electrically connected to said amplifier, and means for establishing an IR compensation correction signal electrically connected to said amplifier, said IR compensation correction means comprising a compensation resistor electrically connected in series with the armature, a first diode having an anode and a cathode, which cathode is electrically connected to said compensation resistor, means for biasing said first diode electrically connected to the anode of said first diode, and an IR compensation transistor having a base electrically connected between said first diode and said first diode biasing means, and an output electrically connected to said amplifier; the improvement comprising a second diode electrically connected in parallel with said compensation resistor and the armature of said motor, a resistor, and a transistor switch having base and collector electrodes said resistor being electrically connected between said second diode and the base of said transistor, and said collector being electrically connected to the base of said IR compensation transistor, wherein said second diode is nonconductive for a portion of a cycle, thereby developing a voltage across said second diode, which voltage acts upon said resistor to bias the transistor into conduction, which conduction reduces the ability of said IR compensation transistor to amplify said IR compensation correction signal, thereby controlling the gain of said IR compensation signal to said amplifier.

5. A control circuit for a DC dynamoelectric machine having a stator and an armature with armature windings connected to a source of DC power, which comprises:
   an amplifier having an input side and an output side;
   a reference speed command control electrically connected to said amplifier input side;
   means for establishing a signal representing uncorrected armature speed, electrically connected to said amplifier input side;
   means for establishing an IR compensation correction signal electrically connected to said amplifier input side;
   means for automatically varying gain applied to said IR compensation correction signal in response to motor speed electrically connected to said means for establishing an IR compensation correction signal; and
   means, responsive to said amplifier output, for controlling armature voltage electrically connected to said amplifier output side.

6. The control circuit of claim 5 wherein said means for automatically varying gain applied to said IR compensation signal includes a rectifier electrically connected in parallel across said armature winding.

7. The control circuit of claim 6 wherein said means for automatically varying gain applied to said IR compensation signal further comprises a switch, responsive to conduction of said rectifier, electrically connected to said rectifier and to said means for establishing an IR compensation signal such that conduction of said rectifier opens said switch and nonconduction of said rectifier closes said switch, whereby closing said switch reduces gain of said IR compensation correction signal.

8. The control circuit of claim 7 wherein said switch is a transistor.

9. The control circuit of claim 6 wherein said means for establishing an IR compensation comprises:
   a resistor electrically connected in series with said armature winding, a diode having an anode and a cathode electrically connected to said resistor at said cathode, a second resistor electrically connected to said anode of said diode and to said power source, an IR compensation transistor having an input side electrically connected between said second resistor and the anode side of said diode, and an output side electrically connected to the input side of said amplifier; and said means for automatically varying gain of said IR compensation signal comprises:
   a potentiometer electrically connected to the output side of said IR compensation transistor and mechanically coupled to said reference speed command control whereby movement of said speed command control so as to require increased armature speed increases output impedance of said IR compensation transistor and reduces the gain of said IR compensation signal.

10. In a control circuit for a DC dynamoelectric machine having a stator and an armature with armature windings connected to a source of DC power, which comprises:
   an amplifier having an input side and an output side;
   a reference speed command control electrically connected to said amplifier input side;
   means for establishing an uncompensated signal representing armature speed, electrically connected to said amplifier input side;
   means for establishing an IR compensation correction signal electrically connected to said amplifier input side, said means comprising a resistor electrically connected in series with said armature winding, a diode having an anode and a cathode electrically connected to said resistor at said cathode, a second resistor electrically connected to said anode of said diode and to said power source;
   an IR compensation transistor having an input side electrically connected between said second resistor and the anode side of said diode, and an output side electrically connected to the input side of said amplifier;
   means for varying gain applied to said IR compensation correction signal, said means comprising a potentiometer electrically connected to the output side of said IR compensation transistor and mechanically coupled to said reference speed command control whereby movement of said speed command control so as to require increased armature speed increases output impedance of said IR compensation transistor and reduces the gain applied to said IR compensation correction signal input to said amplifier; and
   means, responsive to said amplifier output, for controlling armature voltage electrically connected to said amplifier output side.

UNITED STATES PATENT OFFICE
CERTIFICATE OF CORRECTION

Patent No. 3,614,569  Dated October 19, 1971

Inventor(s) Owen E. Reinert

It is certified that error appears in the above-identified patent and that said Letters Patent are hereby corrected as shown below:

Column 4, line 62, after "amplifier," insert --- means for controlling armature voltage electrically connected to said amplifier, ---.

Signed and sealed this 2nd day of May 1972.

(SEAL)
Attest:

EDWARD M. FLETCHER, JR.          ROBERT GOTTSCHALK
Attesting Officer                 Commissioner of Patents